(12) United States Patent
Quinn et al.

(10) Patent No.: US 7,917,416 B2
(45) Date of Patent: Mar. 29, 2011

(54) SYSTEMS AND METHODS FOR SAFEGUARDING EMPLOYEE STOCK OPTIONS FROM STOCK PRICE FLUCTUATIONS

(75) Inventors: Jeffrey Quinn, New Canaan, CT (US); Philip J. Turbin, New York, NY (US); James E. Fields, New York, NY (US); Michael V. Crooks, Norwood, NJ (US); Joseph Vencil, New York, NY (US); Michael W. Emerson, Stony Brook, NY (US); James B. Pomeroy, New York, NY (US)

(73) Assignee: Credit Suisse (USA), Inc., New York, NY (US)

( * ) Notice: Subject to any disclaimer, the term of this patent is extended or adjusted under 35 U.S.C. 154(b) by 1436 days.

(21) Appl. No.: 10/127,121

(22) Filed: Apr. 18, 2002

(65) Prior Publication Data

US 2004/0172349 A1    Sep. 2, 2004

(51) Int. Cl.
*G06Q 40/00* (2006.01)
(52) U.S. Cl. .................. 705/36 R; 705/36 T; 705/37
(58) Field of Classification Search .................. None
See application file for complete search history.

(56) References Cited

U.S. PATENT DOCUMENTS

| | | | |
|---|---|---|---|
| 6,839,686 B1 * | 1/2005 | Galant ................. | 705/36 R |
| 2002/0103852 A1 * | 8/2002 | Pushka ................. | 709/203 |
| 2002/0194136 A1 * | 12/2002 | Sullivan et al. .......... | 705/64 |

OTHER PUBLICATIONS

Boczar, Thomas J. "New moves for concentrated stock positions". ABA Trust & Investments. Washington: Jul./Aug. 2001/ vol. 82 p. 34. (9 pages).*
Natenberg, Sheldon. Option Volatility & Pricing: Advanced Trading Strategies and Techniques, p. 229. From Print Google. (1 page).*
Paul G. Barr, "The fear of hedging", Pensions & Investments, v 26, n. 9, May 4, 1998, pp. 1-4.*
Boczar, Thomas J. "New moves for concentrated stock positions". ABA Trust & Investments. Washington: Jul./Aug. 2001/ vol. 82 p. 34. (9 pages).*
Boczar, Thomas J. "New moves for concentrated stock positions". ABA Trust & Investments. Washington: Jul./Aug. 2001/ vol. 82 p. 34. (9 pages).*
Paul G. Barr, "The fear of hedging", Pensions & Investments, v 26, n 9, May 4, 1998, 4-pages.*
Boczar, Thomas J. "New moves for concentrated stock positions". ABA Trust & Investments. Washington: Jul./Aug. 2001/ vol. 82; 6-pages.*
An introduction to credit spread options; John D Finnerty, Murray Grenville; Financier, Philadelphia; 2002; vol. 9, Iss. 1-4; 10-pages.*
Strategies for concentrated low-basis stock positions; Robert S Keebler; Taxes, v78, n6; Jun. 2000; 4-pages.*
The Valrex model for vuluing employee stock options; Marc S Katsanis; The CPA Journal, New York; Feb. 2002; vol. 72, Iss. 2; 4-pages.*
Using leveraged loans to finance stock puts to employee stock ownership plans; Welytok, Daniel S; Taxes v76 n10; Oct. 1998; 5-pages.*

* cited by examiner

*Primary Examiner* — Alexander Kalinowski
*Assistant Examiner* — Gregory Johnson
(74) *Attorney, Agent, or Firm* — Ropes & Gray LLP

(57) ABSTRACT

Systems and methods for hedging against stock price fluctuations are provided. These systems and methods are preferably directed towards providing executives holding company stock options with opportunities to limit their exposure to fluctuations in the price of stock issued by such companies. This is established through entering into transactions involving stock options with a counterparty.

59 Claims, 8 Drawing Sheets

US 7,917,416 B2

SYSTEMS AND METHODS FOR SAFEGUARDING EMPLOYEE STOCK OPTIONS FROM STOCK PRICE FLUCTUATIONS

BACKGROUND OF THE INVENTION

This invention relates to systems and methods for protecting the value of employee stock options from stock price fluctuations. More particularly, this invention relates to systems and methods for creating and processing hedging transactions (i.e., transactions that limit risk) associated with company stock options held by executive employees.

Stock price fluctuations may be attributed to several factors. Stock price fluctuations may be due to general economic conditions such as the business cycle. Other factors may be more specific to the stock issuing corporation's performance and market conditions. Changes in investment liquidity needs, combined with trading frictions and the arrival of new information, may create temporary buying or selling pressures that cause stock prices to change. Typically, changes in stock prices are unexpected.

Some stocks may be more prone to price fluctuations (i.e., more volatile) than others, thereby making them riskier on a relative basis for investors holding the stock and options on the stock. There have been many approaches to hedging against or managing such risk.

For example, it is possible to hedge against the risk associated with a certain stock, by buying or selling options on the stock. For instance, an individual who owns a particular stock may be unwilling to bear potential losses beyond a certain level. Because the price of the stock could drop at any time below this level, owning such stock on an unhedged basis is inherently risky. To hedge against such risk, the individual may purchase a put option giving him the right to sell the stock at a fixed strike price on or before a given date. In such a situation, the investor's position with respect to the stock is hedged against a decrease in the stock price below the strike price of the option. Thus, even if the stock price drops below the strike price of the option, which will result in a loss in the value of the stock, the investor will be entitled to a payment under the option equal to the difference between the put option's strike price and the stock's actual price at the time of exercise. The payment under the put option will offset the investor's loss on the stock.

It is also possible to purchase call options on stocks enabling holders of the call options to buy shares of stock at a predetermined price. Often times, companies provide certain of their employees, typically executives, with incentive or compensatory options pursuant to option plans. Such executives may be awarded stock options as part of the company's strategy to retain and provide incentives for these executives. The executives may exercise their call options and purchase company stock at a predetermined strike price under certain conditions.

Some executives may prefer not to exercise their options for any number of reasons, including expectations regarding the company's future stock performance. They may wish to delay exercising their call options in anticipation of a future increase in the stock price, or in order to delay the taxable event of realizing gain relating to such an increase. Moreover, a substantial portion of an executive's net worth may include the value of his unexercised options. A significant decrease in the company's stock price may result in a substantial impairment of the executive's net worth.

Hedging company stock options by acquiring put options as described above is typically not an alternative for executives. Federal securities laws typically require executives to own actual shares—rather than just the options to acquire shares—that are being hedged by the options. This restriction is designed to prevent these executives from benefiting from a decline in the market price of the company's stock. Moreover, federal tax rules could limit deductions for loss with respect to the purchase price of the put option if it expired unexercised (e.g., if the stock price does not fall below the put strike price).

In order to overcome these and other disadvantages, it would therefore be desirable to provide executives holding company options with systems and methods for limiting exposure to fluctuations in the market price of the company stock that may be acquired upon exercise of the options.

SUMMARY OF THE INVENTION

It is therefore an object of the present invention to provide systems and methods for executives holding stock options in their own company to limit their exposure to fluctuations in the trading price of the company stock.

This and other objects are accomplished in accordance with the principles of the present invention by providing systems and methods that enable hedging transactions tailored to executives' needs. More specifically these transactions preferably limit an executive's exposure to price fluctuations of the stock issued by his employer that may be acquired by the executive upon exercise of the options. The executive preferably holds vested stock options in the company and may enter into such hedging transactions with a counterparty. The counterparty may be a financial institution engaged in the business of entering into option transactions. The transactions preferably involve the purchase and sale of options, in a structure commonly referred to as a "collar". More specifically, the executive purchases a put option from the counterparty in exchange for selling the counterparty a call option with a higher strike price on the underlying shares of company stock.

A method for hedging employee options held by a company executive, the employee options having a strike price E, preferably includes a counterparty selling a put option having a put strike price P to the executive on a reference date, and buying a call option having a call strike price C from the executive on the reference date, where $E \leq P \leq C$, and where the put option expires no later than the call option.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

Figure 1:
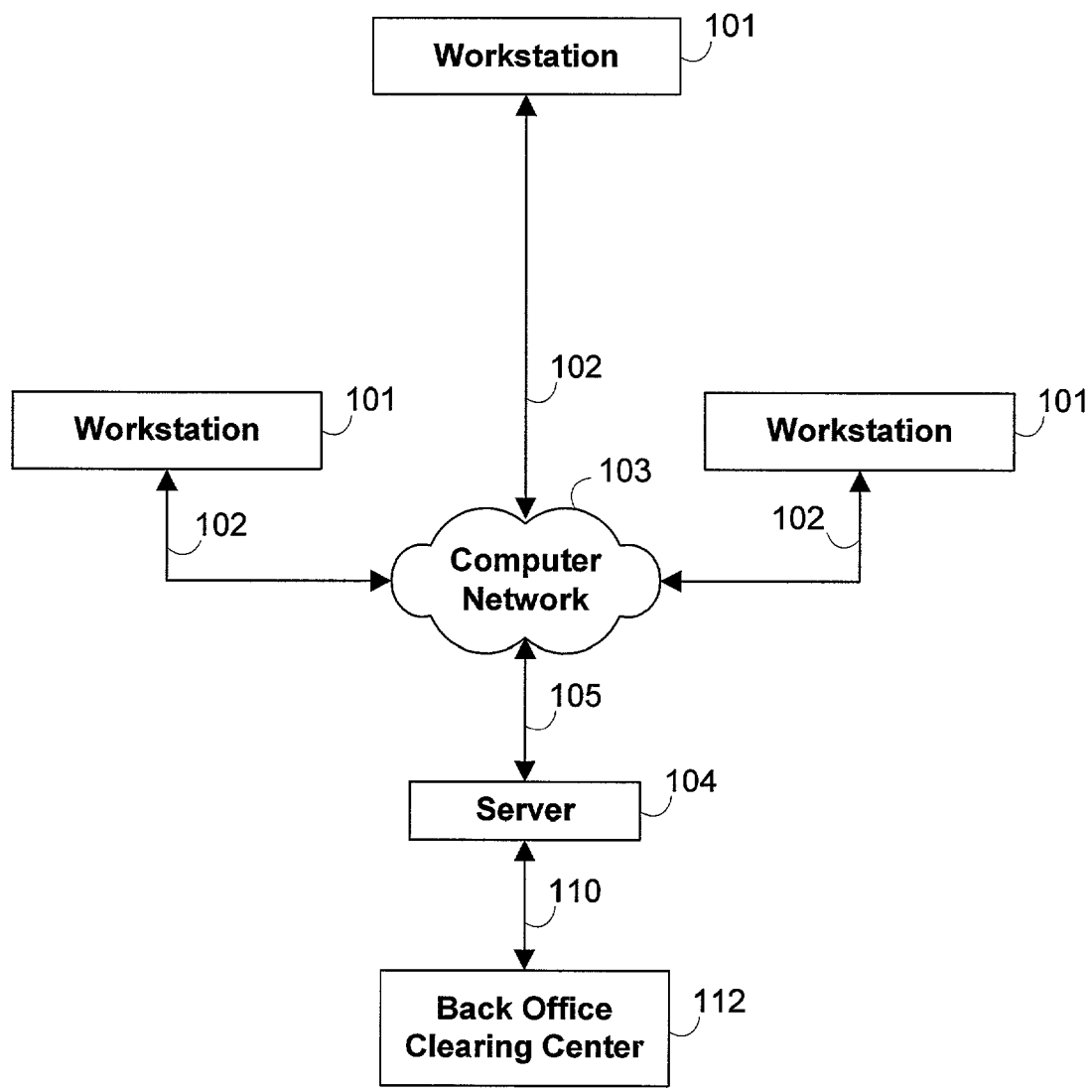
FIG. 1 is a block diagram of a system that may be used to implement the processes and functions of certain embodiments of the present invention.

This invention relates to systems and methods for providing transactions that are useful to stock option holders for protecting against fluctuations in the price of common stock underlying such options. The following discussion is presented in the context of select options that are offered by a company to its executives, as part of an equity compensation incentive plan.

A typical executive in such a company may hold vested, exercisable, compensatory stock options issued by the company. Such employee options may be part of the executive's remuneration for services performed for the company.

In a preferred embodiment, the executive may want to employ systems or methods according to the present invention to protect the value of his employee options vis-à-vis fluctuations in the current price of the company stock by insulating the value of these options from future fluctuations in the price of the stock. The executive would preferably want to avoid the negative consequences of exercising or, alternatively, cashing in (i.e., buying the underlying stock at the strike price of the option and selling the bought stock at a profit) his options. For example, one negative consequence may be that the gains realized by exercising the employee options and settling the underlying stock create an immediate taxable event to the executive. Another negative consequence may be that the executive would be sacrificing future participation in any potential appreciation in the value of the shares underlying the options.

Thus, the executive faces a difficult dilemma with respect to the exercise of his employee options. In a preferred embodiment of the invention, the executive may enter into transactions with a counterparty to realize some of the benefits of exercising the options, while protecting the intrinsic value of the options without being subject to the negative consequences of exercising the options.

A set of transactions are preferably arranged between the executive and a counterparty. The following transactions are preferably undertaken in preferably no required order. The counterparty and the executive preferably undertake two option positions with respect to one another. First, the executive buys a put option from the counterparty. The put option preferably has a strike price at or below the price of the stock at the time the parties enter into the transactions. Preferably, though not necessarily, substantially simultaneously, the executive sells a call option to the counterparty at a price above the price of the stock at the time the parties enter into the transactions. This set of corresponding put and call options is known as a collar. A collar is an options strategy that limits the value of the security or securities underlying the collar between two bounds. By entering into the collar, the executive limits his risk with respect to fluctuations of the stock price to the range bound by the strike price of the put option on the low side and the strike price of the call option on the high side. The counterparty assumes none of the risk within this range and all of the risk outside of it. Thus, the executive is protected from losses, and is also limited from obtaining profits, outside a predetermined or preselected window of net asset value with respect to his options.

Furthermore, the counterparty loans the executive a substantial portion of the money that the executive would receive from exercising his employee options that are hedged by the put option, and settling the underlying shares. In return, the executive pledges his employee options, that are hedged by the put option, to the counterparty in order to secure the loan.

At the maturity of the collar, only one (at most) of the put option or call option can be "in the money" such that it would be economic to exercise either option. It is possible that neither option will be "in the money", and thus neither option will be exercised, because the market price of the company's common stock could be between the put option strike price and the call option strike price at the maturity of the options. In this situation, the executive may find it necessary to exercise some portion of his employee options, or otherwise have available to him the amount of money that would be necessary to repay the loan from the counterparty.

It should be noted that a portion of the loaned amount, the portion being substantially equivalent to the number of underlying shares of stock covered by the employee options that are hedged, multiplied by the strike price of the employee options, is preferably retained by the counterparty in order to allow the counterparty to exercise, or accelerate the exercise of, such employee options if required (e.g., in the case of a default by the executive). This retained amount preferably protects the counterparty from, for example, a default by the executive, because the counterparty controls the exercise of the employee options in a default. The counterparty may additionally be given an irrevocable power-of-attorney to exercise the pledged employee options.

Further details of the invention are described below with respect to FIGS. 1-11.

To better appreciate the following details of the invention, some terms used throughout illustrative examples set forth below are defined in Table 1. It is worth noting that the definitions and illustrative examples which follow focus on shares of stock, stock options and exchanges involving such instruments. Nevertheless, this invention is not limited to the definitions and illustrative examples described herein, which are set forth only for purposes of illustration. Rather, this invention is limited only by the claims which are found at the end of this specification.

Table 1

Company stock—Common stock issued as ownership share(s) by a publicly-held corporation (company).

Counterparty—A bank, broker-dealer or other financial institution engaged in the business of entering into option transactions.

Employee option—A compensatory call option on a fixed number of shares of company stock issued to an employee of a company by the company. This option may be an American-style option, meaning that it is exercisable at any time, up to, and including its expiration date.

Executive—A senior executive employee or officer of the company issuing the employee options, such as its president, director, CEO, CFO, COO, etc., or any employee or other person holding employee options.

Employee option strike price—E—The predetermined dollar amount per share associated with the employee option and paid by the executive in order to receive each underlying share of company stock.

Hedge put—A put option giving the option owner the right to sell a fixed number of shares of company stock at the hedge put strike price (see below). This option is preferably a European-style option, meaning that it is exercisable only on its expiration date.

Hedge put strike price—P—The predetermined dollar amount per share of company stock paid to the hedge put owner in exchange for selling each share of the fixed number of shares of company stock.

Hedge call—A call option giving the option owner the right to buy a fixed number of shares of company stock at the hedge call strike price (see below). This option is preferably a European-style option, meaning that it is exercisable only on its expiration date.

Hedge call strike price—C—The predetermined dollar amount per share of company stock paid by the hedge call owner in exchange for buying each share of the fixed number of shares of company stock.

Hedge option(s)—Any of the hedge call, the hedge put, or both.

Reference date—The date on which the executive and the counterparty enter into transactions involving the hedge options.

Reference stock price—RS—The dollar amount per share associated with the company stock price on the reference date.

Settlement date—The date on which the transactions involving the hedge options between the executive and the counterparty are settled.

Settlement stock price—SS—The dollar amount per share associated with the company stock price on the settlement date.

In the money—In respect to a call option (including a hedge call), when the strike price is less than the prevailing market price for the underlying stock, and in respect to a put option (including a hedge put), when the strike price is greater than the prevailing market price for the underlying stock.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 may be used to process and settle the transactions entered into by one or more executives and the counterparty.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used by executives or the counterparty in order to enter into and proceed with the transactions that relate to the present invention.

Back office clearing center 112 may be any suitable equipment, such as a computer, a laptop computer, a mainframe computer, etc., or any combination of the same, for causing transactions to be cleared and/or verifying that transactions are cleared. Communications link 110 may be any communications links suitable for communicating data between server 104 and back office clearing center 112, such as network links, dial-up links, wireless links, hard-wired links, etc.

Figure 2:
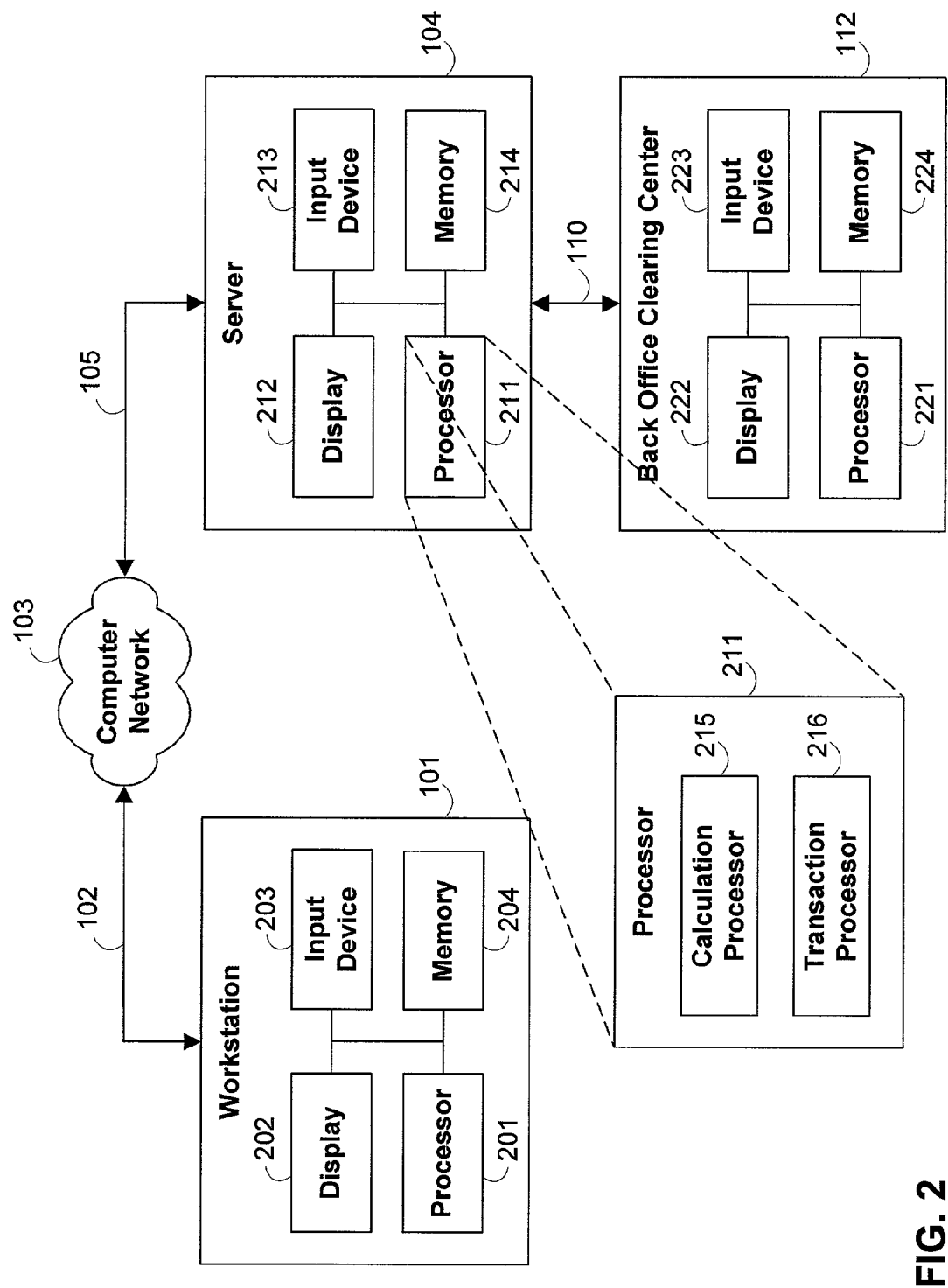
FIG. 2 is a block diagram of a workstation and a server that may be used to implement the processes and functions of certain embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 uses the workstation program to present on display 202 transaction information relating to employee options and hedge options to a user of workstation 101. Such transaction information may include offers to buy and sell the hedge options. Furthermore, input device 203 may be used to receive such offers and to enter into transactions involving such options.

Server 104 may include processor 211, display 212, input device 213, and memory 214, which may be interconnected. In a preferred embodiment, memory 214 contains a storage device for storing transaction information relating to the transactions entered into by the counterparty and the executive. The storage device further contains a server program for controlling processor 211. Processor 211 uses the server program to transact the purchase and sale of the hedge options. Processor 211 may include calculation processor 215 that determines the value of the hedged options based on market conditions that relate to such options. Processor 211 may include transaction processor 216 that Ago processes transactions entered into by the counterparty and the executive.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to complete the transactions that are entered into by the executive and the counterparty and to clear these transactions as well. Processor 221 uses the clearing program to further verify that the transactions are completed and cleared.

Figure 3:
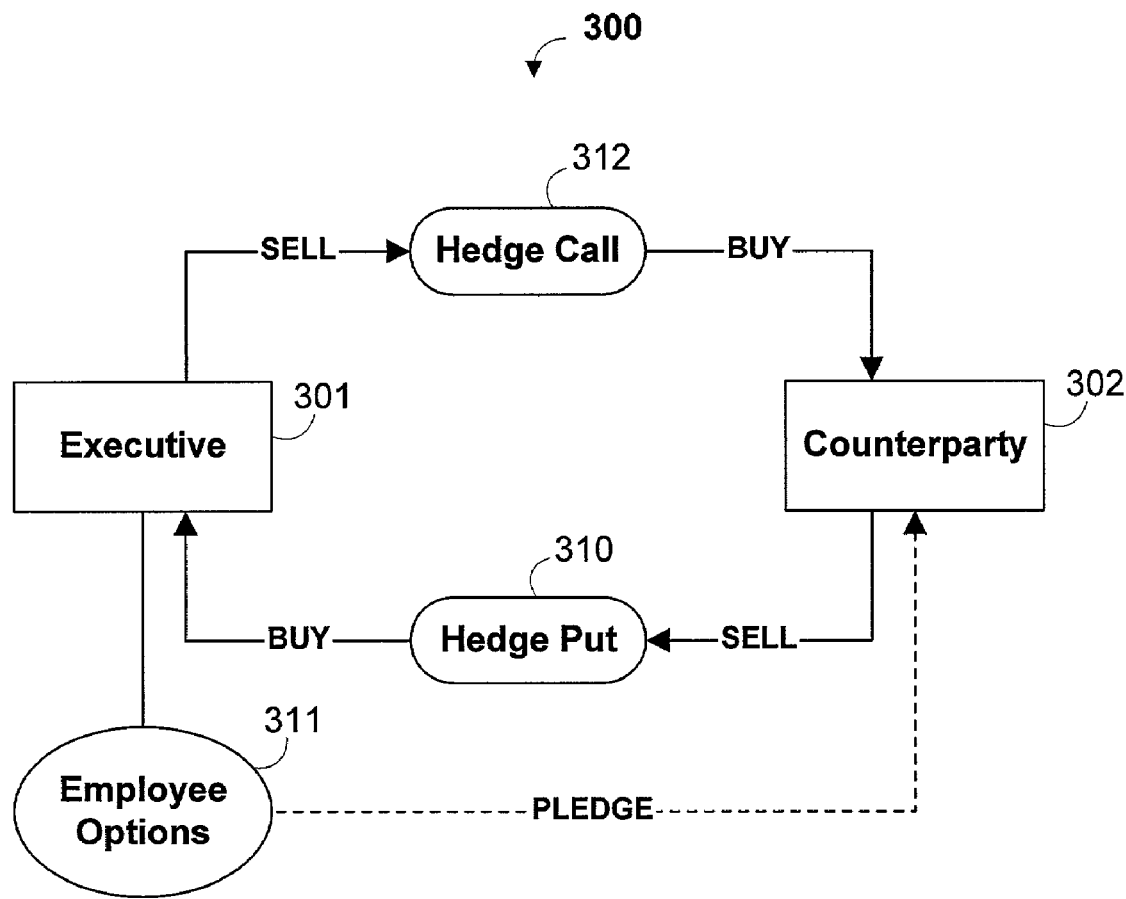
FIG. 3 is a diagram illustrating transactions between the executive and the counterparty in accordance with certain embodiments of the present invention.

FIG. 3 depicts typical transactions 300 involved between executive 301 and counterparty 302. Executive 301 may preferably be any officer that works for a company that awards its employees stock options, namely employee options 311. Counterparty 302 may preferably be a U.S. or foreign bank, or any individual or institution licensed to trade financial instruments. Both parties preferably enter into the transactions on a reference date.

The transactions between executive 301 and counterparty 302, according to the invention, may involve an exchange of hedge options: the first being hedge put 310 which executive 301 purchases from counterparty 302, the second being hedge call 312, which executive 301 sells to counterparty 302.

The hedge put and hedge call strike prices may be determined on or with reference to the reference date. These prices may be subject to changes under certain situations such as stock splits, stock dividend payments, or any similar changes in capitalization. For the transactions to be desirable and practical according to the present invention, the hedge call strike price is preferably higher than the hedge put strike price, although the amount of this excess may vary.

Typical employee options are not transferable under company contractual terms. Nevertheless, in accordance with the present invention, executive 301 may pledge employee options 311 to counterparty 302. Preferably, the terms of the incentive plan under which employee options are awarded either permit, or may be amended to permit, such pledging of the employee options to the counterparty, without changing ownership title to the employee options.

In a preferred embodiment of the present invention, hedge options 310 and 312 expire and are therefore exercisable on the same date (i.e., the settlement date). The settlement date preferably is not later than the expiration date of the employee options (i.e., the date after which the executive may no longer exercise his employee options). Moreover, hedge options 310 and 312 preferably relate to the same underlying number of shares of company stock, and the number of shares to which each of them relates preferably does not exceed the number of shares to which the employee options entitles the executive. Furthermore, employee options 311 are preferably in the money on the reference date.

Preferably, and in an alternate embodiment of the present invention, hedge call 312 may expire earlier than hedge put 310. The underlying number of shares of company stock relating to hedge call 312 may be greater than the underlying number of options relating to hedge put 310.

Though the reference stock price may be at any predetermined level with respect to the strike prices of the hedge options, the reference stock price is preferably between the hedge call strike price and the hedge put strike price. The difference between the hedge call strike price and the hedge put strike price preferably provides the executive with a sufficient financial interest in the price of the stock such that the transactions do not form a constructive sale for purposes of realization of a taxable event.

In yet another alternate embodiment of the present invention, employee options 311 may be deep in the money on the reference date, and hedge put 310's strike price may be equal to or lower than the reference stock price.

Figure 4:
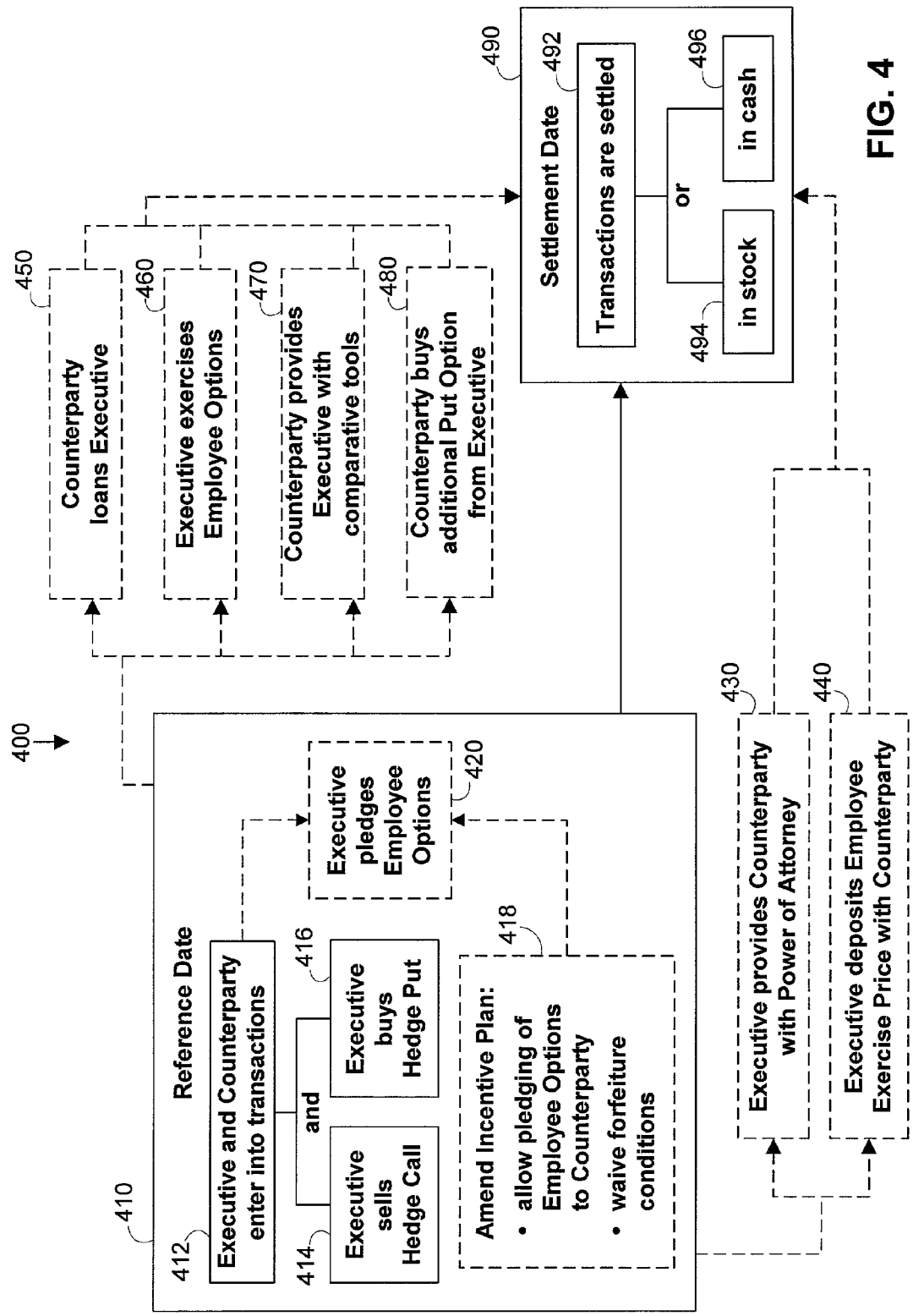
FIG. 4 is a flow chart illustrating transactions in accordance with certain embodiments of the present invention.

FIG. 4 shows flow chart 400 illustrating a proposed method according to the invention. For clarity, dotted lines and boxes in this figure represent preferable events or steps that may occur under certain circumstances.

Step 410 illustrates the transactions that preferably occur on the reference date. At step 412, the executive and the counterparty enter into transactions establishing the aforementioned collar with respect to the company stock, whereby: the executive sells one or more hedge call options on one or more shares of company stock to the counterparty at step 414, and buys one or more hedge put options on the company stock from the counterparty at step 416. The strike prices of the hedge options may be established on the reference date as well.

In order to secure such transactions, the company incentive plans preferably permit or may be amended at step 418 to allow the executive to pledge or assign the employee options to the counterparty, while retaining ownership title. In addition, original terms in such incentive plans usually provide that the employee options may be forfeited prior to their expiration date under certain conditions, such as employment termination for cause. Such terms may be amended or deleted to eliminate any potential forfeiture of the employee options in order to protect the interests of the counterparty at step 418 as well. This step preferably protects the counterparty from, for example, executive default on the hedge call option. At step 420, the executive may pledge his employee options to the counterparty as discussed above.

In addition, the executive may provide the counterparty with a power-of-attorney that may be irrevocable and that authorizes the counterparty to exercise the employee options and/or the hedge put on the executive's behalf on the settlement date at step 430. The executive may also choose to exercise the employee options and/or the hedge put on the settlement date himself.

Because the establishment of the collar guarantees a minimum net asset value NAV to the executive equal to the difference between the hedge put strike price and the employee option strike price, the counterparty may loan a substantial portion of the hedge put strike price to the executive on or after the reference date, at step 450, while retaining the employee option strike price, which the executive may deposit in escrow with the counterparty at step 440. Interest on the loan may be subsequently paid to the counterparty or may be alternatively discounted from the amount initially loaned to the executive.

In one embodiment of the invention, the executive may choose to exercise his employee options at step 460 between the reference and settlement dates. In such a case, the shares of company stock issued upon exercise may be pledged to the counterparty, thereby replacing the pledged employee options.

In addition, the counterparty may use known or proprietary software in order to calculate the prices of such hedge options. Such software may be based on models for pricing derivative securities. Such software may also provide tools for executives to compare the payoffs and net asset values resulting from entering into such transactions with the counterparty as opposed to not entering into them or simply exercising their employee options at step 470. Such software may be implemented on system 100 depicted in FIG. 1 and may be used to form an electronic system that is used to process a method according to the invention.

Figure 9:
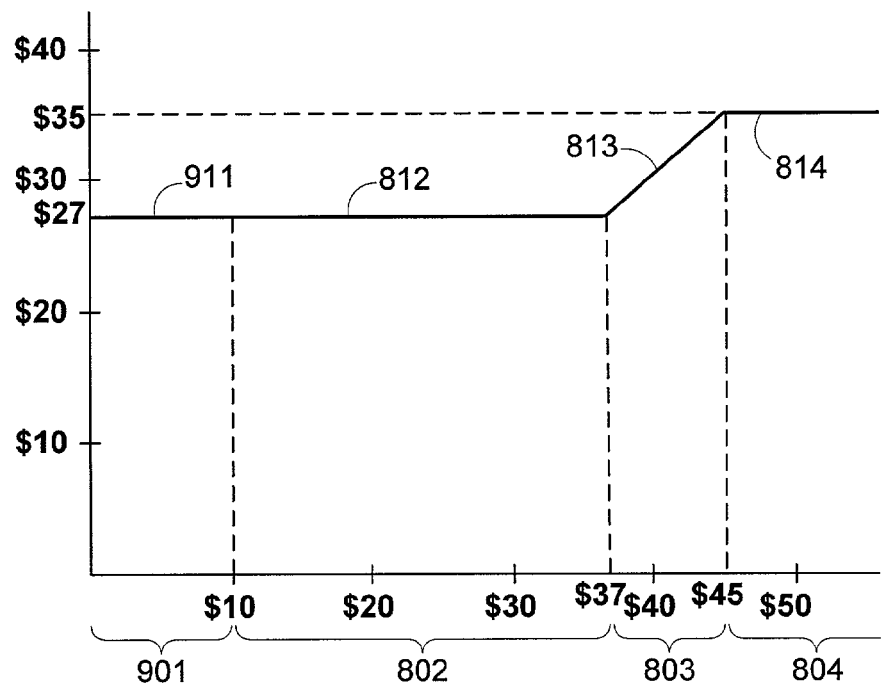
FIG. 9 is a plot of a modified net asset value resulting from the combined options payoffs illustrated in FIGS. 5-7 in accordance with certain embodiments of the present invention.

At step 480, the counterparty may further acquire an additional put option on company stock from the executive in order to prevent the executive from benefiting under the hedge put from a decline in the company stock price beyond the employee option strike price, as will be understood in the discussion of FIG. 9.

Step 490 of FIG. 4 illustrates the transactions that may occur on the settlement date. Assuming the settlement stock price is less than the hedge put strike price at step 492, the hedge put is preferably settled. On the other hand, if the settlement stock price is greater than the hedge call strike price at step 492, the hedge call is preferably settled. The hedge options may be settled in stock at step 494, or in cash at step 496. If the hedge options are settled in stock, then the executive may repay the counterparty the loan. If the hedge options are settled in cash, then the full value of the loan is preferably repaid to the counterparty from the proceeds of the exercise of the employee options, or from some other source of funds.

For simplicity, the following technical discussion of the execution of the various options focuses on a single employee option on a single share of company stock, a single hedge put on a single share of company stock, and a single hedge call on a single share of company stock. Nevertheless, the number of hedge put or hedge call options may be any number of options bought or sold on any number of shares of underlying company stock. In a preferred embodiment of the invention, the number of underlying shares corresponding to the hedge put and hedge call options preferably does not exceed the number of shares of company stock subject to vested employee options held by the executive on the reference date. Because only one of the hedge put or hedge call options may be exercised on the settlement date, each may involve the total number of shares of company stock underlying the employee options.

Figure 5:
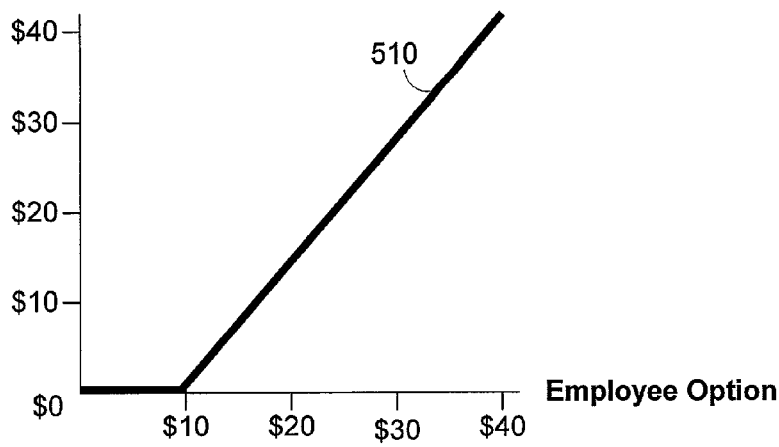
FIG. 5 is a plot of the payoff on an employee option versus underlying company stock price in accordance with a typical call option.
Figure 6:
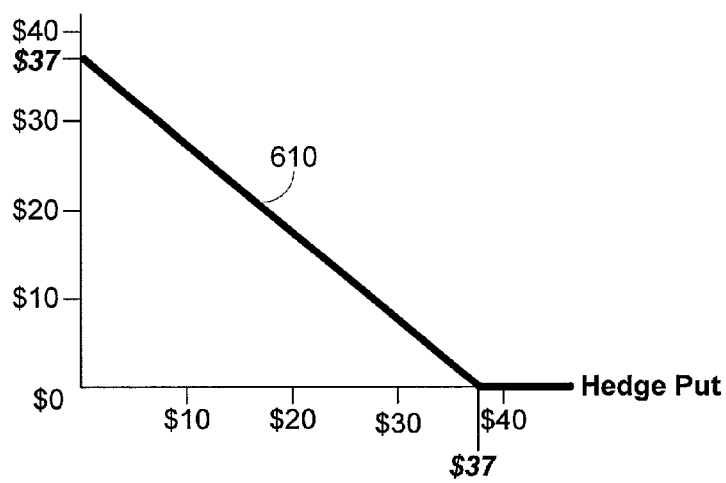
FIG. 6 is a plot of the payoff on a bought hedge put versus underlying company stock price in accordance with a typical put option.
Figure 7:
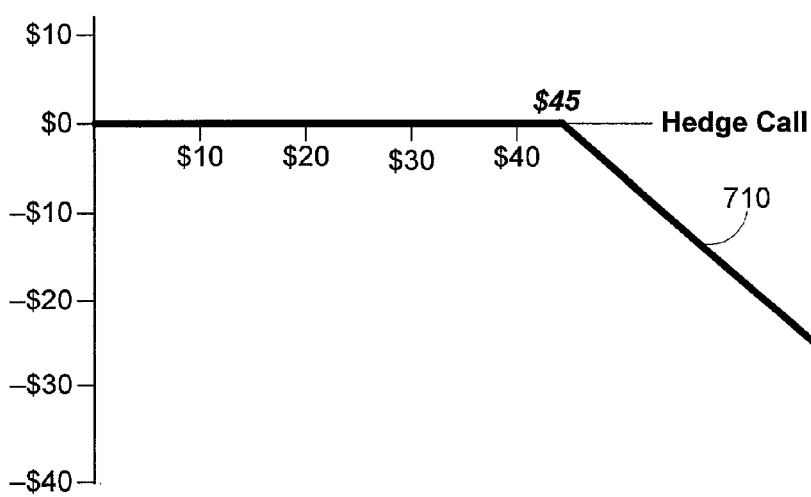
FIG. 7 is a plot of the payoff on a sold hedge call versus underlying company stock price in accordance with a typical call option.

FIGS. 5-7 plot the payoffs associated with the employee option, the hedge put, and the hedge call, respectively. Bold lines 510 of FIG. 5, 610 of FIG. 6, and 710 of FIG. 7 represent the payoffs associated with the employee option, the hedge put, and the hedge call respectively. The price of exercising any of the options is omitted for simplicity. Nevertheless, the transaction costs associated with exercising the options should preferably be calculated as is known in the art.

Referring to FIG. 5, an employee option (as depicted by element 311 in FIG. 3) may have an employee option strike price of $10 for example (E=$10). The executive may therefore buy a share of company stock for $10 and sell it at a profit whenever the employee option is in the money.

Referring to FIG. 6, a hedge put (as depicted by element 310 in FIG. 3) may have a strike price of $37 for example (P=$37). The executive may therefore require the counterparty to buy a share of company stock for $37 if the hedge put is in the money on the settlement date.

Referring to FIG. 7, a hedge call (as depicted by element 312 in FIG. 3) may have a strike price of $45 for example (C=$45). The counterparty may therefore require the executive to sell a share of company stock for $45 if the hedge call is in the money on the settlement date.

According to the present invention, the executive sells the counterparty the hedge call as well as the additional put option on the reference date. By selling the hedge call and the additional put option, the executive is able to purchase the hedge put from the counterparty on the reference date with no additional cost. These transactions may also be considered an exchange of hedge options between the executive and the counterparty.

Figure 8:
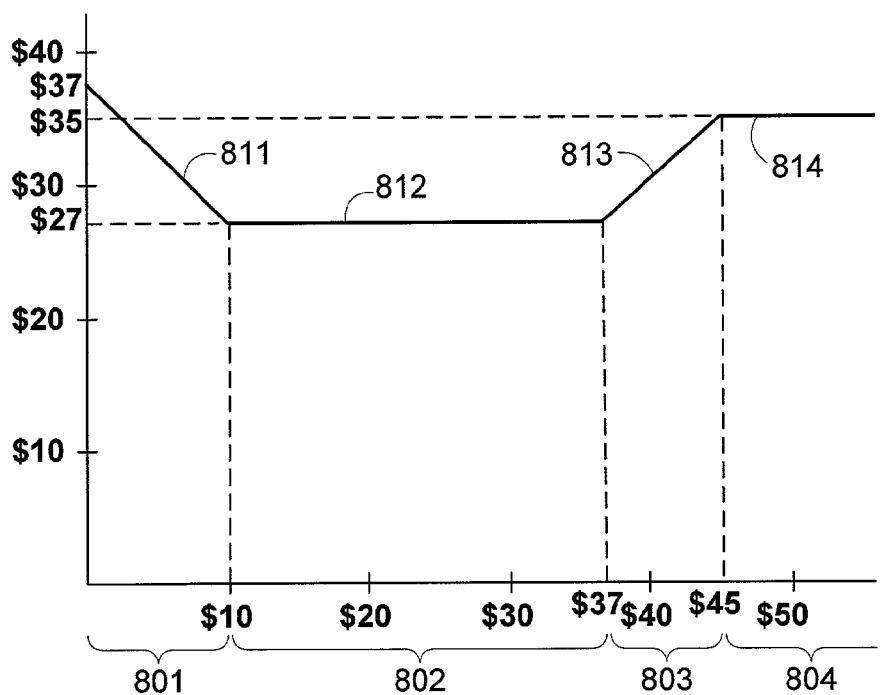
FIG. 8 is a plot of the net asset value resulting from the combined options payoffs illustrated in FIGS. 5-7 in accordance with a typical combination of call and put options.

FIG. 8 plots the net asset value of the combined payoffs, illustrated in FIGS. 5-7, of the employee option and the hedge options. FIG. 9 plots a modified net asset value of the combined payoffs, illustrated in FIGS. 5-7, of the employee option and the hedge options.

FIG. 8 illustrates four possible outcomes: region 801 associated with outcome 811, region 802 associated with outcome 812, region 803 associated with outcome 813, and region 804 associated with outcome 814. FIG. 9 illustrates the exact same outcomes illustrated in FIG. 8, with the only difference being represented in region 901, which is substituted for region 801 in FIG. 8, and which is associated with outcome 911 in FIG. 9. The reason for this difference will become apparent from the following.

In region 802 of FIG. 8, the settlement stock price SS is between $10 (the employee option strike price) and $37 (the hedge put strike price). In this case, the executive may choose to exercise his hedge put option. The executive may therefore sell the share of company stock for $37 dollars. Assuming the stock reference stock price RS is $40 and its settlement price SS is $30, the executive may insulate himself from $7 of the $10 decline in the market price of the company stock that occurred between the reference date and the settlement date.

In one embodiment of the invention, the hedge put may be settled in stock. Such physical settlement would require the exercise of the employee options in order for the counterparty to receive company stock. The executive would therefore pay $10 for the company stock and sell that stock for $37, realizing P−E =$27. This net asset value NAV is constant in this embodiment as long as the settlement stock price lies within the bounds of region 802.

In another embodiment, the hedge put may be settled in cash. That would require the counterparty to make a cash payment to the executive equal to the difference between the hedge put strike price ($37) and the settlement stock price ($30), resulting in a net payment of P−SS=$7. In addition, the executive may exercise the employee option to obtain the share of company stock and realize a profit of $20 based on the settlement stock price. This results in a net asset value NAV of $27. Even if the company stock price drops to $20 on the settlement date, the executive would then receive $17 from the counterparty while his employee options would be worth $10, thereby adding up to $27. This net asset value remains constant in this embodiment as long as the settlement stock price lies within the bounds of region 802.

In region 803, the settlement stock price SS is between $37 (the hedge put strike price) and $45 (the hedge call strike price). In this case, exercising the employee option results in an incremental value in addition to the hedge put strike price. The net asset value NAV equal to SS−E in region 803, is equal to the difference between the settlement stock price and the employee option strike price, should the executive choose to exercise his employee options. In this region, preferably neither of the hedge options is exercised.

In region 804, the settlement stock price SS is above $45 (the hedge call strike price). In this case, the counterparty may choose to exercise the hedge call. The employee option would therefore be exercised in order for the company stock to be delivered to the counterparty at the hedge call strike price when settled in stock. For instance, the executive receives C−E=$35, which amount is fixed within region 804, regardless of the settlement stock price. If the hedge call is settled in cash, the counterparty would receive SS−C from the executive.

In regions 802, 803, and 804 of FIG. 8, the executive does not benefit from a decline in the stock price, because his net asset value is fixed in regions 802 and 804, and because a higher settlement stock price would result in a higher net asset value in region 803. In region 801 however, the executive may benefit from a substantial decline in the stock price. Because the settlement stock price would be lower than the employee option strike price, the executive may be able to purchase shares of company stock in the market at the settlement stock price instead of at the employee option strike price and deliver them to the counterparty at the hedge put strike price, therefore realizing outcome 811. This result may be inconsistent with certain provisions of the federal securities laws that are designed to preclude executives from benefiting from a decline in the price of their company's stock. In accordance with the present invention, the systems and methods preferably are modified to preclude the aforementioned possibility.

FIG. 9 illustrates this modification according to the present invention. If the settlement stock price is lower than the employee option strike price, as in region 901, that may result in outcome 911 to the executive, as explained below.

If the transactions are settled in stock, the employee options will be exercised in order for the executive to obtain shares of company stock at the employee option strike price. These shares may then be sold to the counterparty at the hedge put strike price P. If the transactions are settled in cash, the executive's cash entitlement may be calculated based on the difference between the hedge put strike price P and the employee option strike price E, as opposed to the stock settlement price SS. In either case, the executive's net asset value in region 802 is limited to the difference between the hedge put strike price P and the employee option strike price E as in region 802 of FIGS. 8 and 9.

In an alternate embodiment, the counterparty may buy an additional put option on the company stock from the executive on the reference date, where the additional put option preferably has a strike price equal to the employee option strike price E. This is illustrated in step 480 of FIG. 4 and constitutes an alternate provision to the situation in which the settlement stock price SS falls below the employee option strike price E in region 801 of FIG. 8. In this case, the counterparty may require the executive to buy shares of company stock at the employee option strike price E. The executive's net asset value in region 901 of FIG. 9 is therefore limited to the difference between the hedge put strike price P and the employee option strike price E as illustrated by outcome 911 of FIG. 9. Alternatively, the additional put option may have a strike price that is greater than P.

As described above, the proposed transactions are designed to limit the executive's exposure to fluctuations in price of the company stock. It is the counterparty that bears the risk of a decline in the company stock below the hedge put strike price. In return, the counterparty obtains the right to profit from the potential appreciation in the company stock in excess of the hedge call strike price. On the other hand, the executive retains the benefit of any appreciation in the company stock between the hedge option strike prices. It should be noted that the executive preferably retains a sufficient financial interest in the rise and fall of the price of the stock such that the transactions between the executive and the counterparty are not considered a constructive sale resulting in the realization of taxable income. This determination may be made by one knowledgeable in the state of the art.

In another embodiment of the invention, if both hedge options are undertaken on more than one share of company stock (e.g., X number of shares), then any net asset value would be multiplied by X. For example, referring to region 802 in FIG. 8, the executive's net asset value NAV would be $X*(P-E)$.

The systems and methods according to the present invention offer several advantages to an executive holding company stock options. One of these advantages is the opportunity to hedge against stock price fluctuations, free from certain securities law exposure, by establishing a collar. One of the elements of a collar is a protective put. The cost to the executive of this protective or hedge put option is financed by the executive's sale of the hedge call and the additional put option to the counterparty, on the same underlying stock. Therefore, the cost of the hedge put is substantially offset by that of the hedge call and the additional put option. The trading of such hedge options may be alternatively treated as an exchange as opposed to the separate sales. In addition, an expense resulting from the sale of hedge options, physical settlement, expiration of the hedge put due to worthlessness, or settlement in cash may be treated as arising from a sale or exchange of an ordinary asset for tax purposes.

Moreover, upon entering into such transactions, an executive may obtain a loan that represents a nontaxable cash inflow, that locks in a future payment as early as the reference date, and that is substantially immediately provided and guaranteed by the counterparty. Furthermore, executives may choose to enter into the transactions described herein in order to delay the tax event of the cashing in of options, while, for a predetermined amount of time, enjoying the profits from the options in the form of a loan from the counterparty.

In an alternate embodiment of the present invention, the transaction regarding the employee options that occurs between the executive and the counterparty may be implemented as a forward sale of the company stock instead of a pledge of options. For example, the executive may agree to sell the shares underlying the employee options in the future to the counterparty. Thus, the payment received by the executive on the reference date may preferably be proceeds from the agreed-upon sale instead of a loan.

Figure 10:
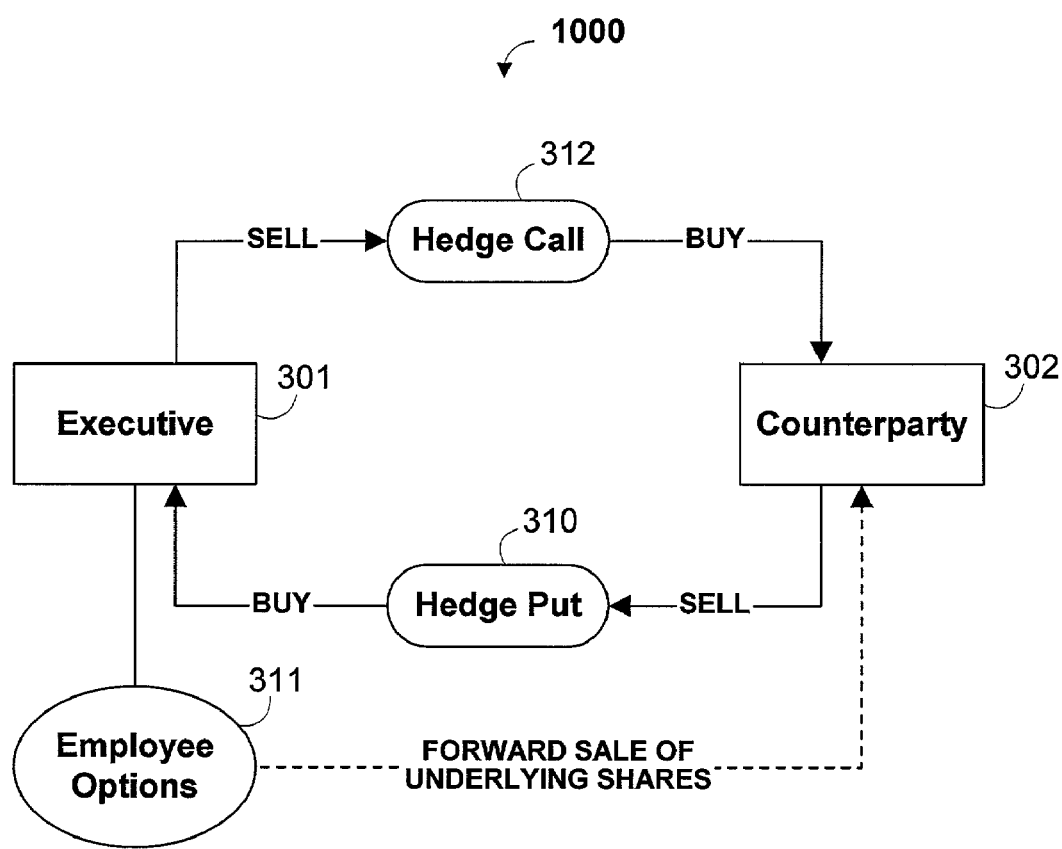
FIG. 10 is a diagram illustrating transactions between the executive and the counterparty in accordance with certain embodiments of the present invention.

FIG. 10 illustrates such an embodiment. In addition to the transactions relating to hedge options 312 and 310, transactions 1000 include the forward sale of the shares underlying employee options 311 from executive 301 to counterparty 302. Even though such a sale may be agreed to on the reference date, executive 301 preferably retains sufficient ownership interest in the options such that the forward sale is not considered a constructive sale, for tax purposes. This is accomplished because the shares underlying employee options 311 are sold for an amount to be determined on a later date. Nevertheless, executive 301 may receive, on the reference date, at least the hedge put strike price less the employee option strike price, which is the minimum asset value guaranteed by the methods according to the present invention. Thus, even though executive 301 may agree to sell the shares underlying employee options 311, executive 301 benefits from the rise in the company stock price (and, conversely, loses from the fall in the company stock price) as long as the stock moves within the range between the hedge put strike price and the hedge call strike price.

Figure 11:
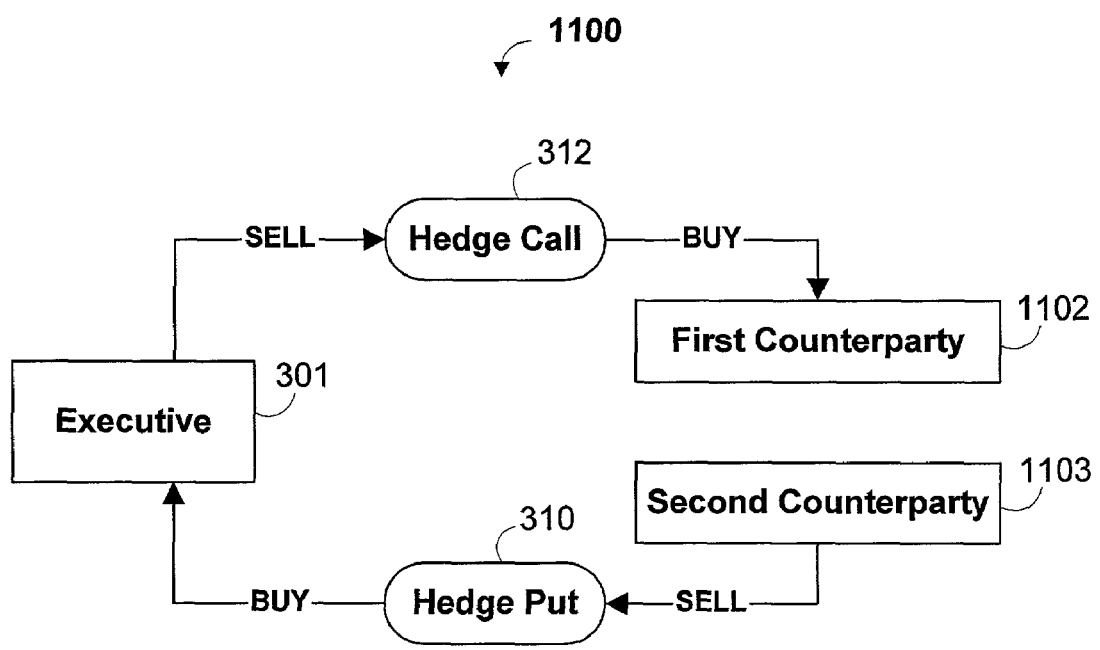
FIG. 11 is a diagram illustrating transactions between the executive and more than one counterparty in accordance with certain embodiments of the present invention.

In yet another embodiment of the present invention, referring to FIG. 11, executive 301 may enter into hedging transactions 1100 with more than one counterparty. Specifically, executive 301 may sell hedge call 312 to first counterparty 1102 and buy hedge put 310 from second counterparty 1103.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method for protecting the value of compensatory employee options issued to an executive of a company, the employee options being stock options on company stock and having an employee option strike price E, the method comprising:

hedging the employee options using a calculation processor that determines the values of call and put options based on market conditions relating to the employee options, the hedging comprising:

buying a call option on company stock from the executive on a reference date;

selling a first put option on company stock to the executive on the reference date, the first put option having a first put strike price P, the call option having a call strike price C, wherein $E \leq P \leq C$, the call option expiring on a settlement date, the first put option expiring on a date no later than the settlement date;

determining a second put option strike price that prevents the executive from benefiting from a decline in price of the company stock below E; and buying a second put option on company stock from the executive on the reference date, the second put option having the determined second put option strike price.

2. The method of claim 1 further comprising receiving a pledge of the employee options from the executive on the reference date.

3. The method of claim 1 further comprising receiving a deposit from the executive on the reference date, the deposit being substantially equal to the employee option strike price E.

4. The method of claim 1 further comprising loaning the executive an amount substantially equal to P no later than the settlement date.

5. The method of claim 1 further comprising receiving a power-of-attorney from the executive to exercise the employee options.

6. The method of claim 1 further comprising receiving approval from the company to allow the employee options to be non-forfeitable.

7. The method of claim 1 further comprising receiving approval from the company to allow the employee options to be assignable.

8. The method of claim 1 further comprising agreeing to buy shares of company stock underlying the employee options from the executive at an amount no less than P−E.

9. The method of claim 1 further comprising identifying employee options that are in the money no later than the reference date.

10. The method of claim 1 further comprising guaranteeing the executive a net asset value NAV, on the settlement date, wherein $(P-E) \leq NAV \leq (C-E)$.

11. The method of claim 1 further comprising settling at least one option from the group consisting of the employee options, the call option, the first put option, and the second put option on the settlement date.

12. The method of claim 1 wherein the buying the call option comprises buying a call option on a number X of shares of company stock, and wherein the selling the first put option comprises selling a put option on the number X of shares of company stock, the number X of shares of company stock being no greater than a number of shares of company stock corresponding to the employee options.

13. The method of claim 12 further comprising receiving a deposit from the executive on the reference date, the deposit being substantially equal to X*E.

14. The method of claim 12 further comprising loaning the executive an amount substantially equal to X*P no later than the settlement date.

15. The method of claim 12 further comprising guaranteeing the executive a net asset value NAV, on the settlement date, wherein $X*(P-E) \leq NAV \leq X*(C-E)$.

16. The method of claim 12 further comprising:
when $C \leq SS$, where SS is the price of the company stock on the settlement date, exercising the call option in order to receive X number of shares of company stock and deliver to the executive X*C; and
when $SS \leq P$, exercising the first put option in order to receive X number of shares of company stock and deliver to the executive X*P.

17. The method of claim 12 further comprising:
when $C \leq SS$, where SS is the price of the company stock on the settlement date, receiving from the executive X*(SS−C); and
when $SS \leq P$, delivering X*(P−SS) to the executive on the settlement date.

18. A method for protecting the value of compensatory employee options issued to an executive of a company, the employee options being stock options on company stock and having an employee option strike price, the method comprising:
hedging the employee options using a calculation processor that determines the values of call and put options based on market conditions relating to the employee options by buying a call option on company stock from the executive on a reference date and selling a first put option on company stock to the executive on the reference date, the call option having a call strike price, the first put option having a first put strike price that is lower than the call strike price and higher than the employee option strike price, the call option expiring on a settlement date, the first put option expiring on a date no later than the settlement date;
determining a second put option strike price that prevents the executive from benefiting from a decline in price of the company stock below the employee option strike price; and
buying a second put option on company stock from the executive on the reference date, the second put option having the second put option strike price.

19. The method of claim 1 wherein the determining of the second put option strike price comprises setting the second put option strike price substantially equal to E.

20. The method of claim 1 wherein the determining of the second put option strike price comprises setting the second put option strike price, P2, such that $P \leq P2 \leq C$.

21. The method of claim 18 further comprising receiving a pledge of the employee options from the executive on the reference date.

22. The method of claim 18 further comprising receiving a deposit from the executive on the reference date, the deposit being substantially equal to the employee option strike price.

23. The method of claim 18 further comprising, on a date no later than the settlement date, loaning the executive an amount substantially equal to the first put strike price.

24. The method of claim 18 further comprising receiving a power-of-attorney from the executive to exercise the employee options.

25. The method of claim 18 further comprising receiving approval from the company to allow the employee options to be non-forfeitable.

26. The method of claim 18 further comprising receiving approval from the company to allow the employee options to be assignable.

27. The method of claim 18 further comprising agreeing to buy shares of company stock underlying the employee options from the executive at an amount no less than the difference between the first put strike price and the employee option strike price.

28. The method of claim 18 further comprising guaranteeing a net asset value to the executive on the settlement date, wherein the net asset value is no less than the difference between the first put strike price and the employee option strike price, and no greater than the difference between the call strike price and the employee option strike price.

29. The method of claim 18 further comprising settling at least one option from the group consisting of the employee options, the call option, the first put option, and the second put option on the settlement date.

30. The method of claim 18 wherein the buying the call option comprises buying a call option on a first number of shares of company stock, and wherein the selling the first put option comprises selling a put option on a second number of shares of company stock, the second number of shares being no greater than the first number of shares, the first number of shares being no greater than the number of shares of company stock corresponding to the employee options.

31. The method of claim 18 further comprising:
when the price of the company stock on the settlement date is greater than the call strike price, exercising the call option in order to receive a share of company stock and deliver to the executive the call strike price; and when the price of the company stock on the settlement date is lower than the first put strike price, exercising the first put option in order to receive a share of company stock and deliver to the executive the first put strike price.

32. The method of claim 18 further comprising:

when the price of the company stock on the settlement date is greater than the call strike price, receiving from the executive the difference between the price of the company stock on the settlement date and the call strike price; and when the price of the company stock on the settlement date is lower than the first put strike price, delivering to the executive the difference between the first put strike price and the price of the company stock on the settlement date.

33. A method for protecting the value of compensatory employee options, the employee options being stock options on stock issued by a company and having an employee option strike price, the method comprising:

hedging the employee options using a calculation processor that determines the values of call and put options based on market conditions relating to the employee options by selling a call option on company stock to a counterparty on a reference date and buying a first put option on company stock from the counterparty on the reference date, the call option having a call strike price, the first put option having a first put strike price that is lower than the call strike price and higher than the employee option strike price, the call option expiring on a settlement date, the first put option expiring on a date no later than the settlement date;

determining a second put option strike price that prevents the executive from benefiting from a decline in price of the company stock below the employee option strike price; and selling a second put option on company stock to the counterparty on the reference date, the second put option having the second put option strike price.

34. The method of claim 33 further comprising pledging the employee options to the counterparty on the reference date.

35. The method of claim 33 further comprising depositing the employee option strike price with the counterparty on the reference date.

36. The method of claim 33 further comprising borrowing an amount substantially equal to the first put strike price no later than the settlement date.

37. The method of claim 33 further comprising giving the counterparty a power-of-attorney to exercise the employee options.

38. The method of claim 33 further comprising receiving approval from the company to allow the employee options to be non-forfeitable.

39. The method of claim 33 further comprising receiving approval from the company to allow the employee options to be assignable.

40. The method of claim 33 further comprising agreeing to sell shares of company stock underlying the employee options to the counterparty for an amount no less than the difference between the first put strike price and the employee option strike price.

41. The method of claim 33 further comprising being guaranteed a net asset value on the settlement date, wherein the net asset value is no less than the difference between the first put strike price and the employee option strike price, and wherein the net asset value is no greater than the difference between the call strike price and the employee option strike price.

42. The method of claim 33 further comprising settling at least one option from the group consisting of the employee options, the call option, the first put option, and the second put option on the settlement date.

43. The method of claim 33 wherein the selling the call option comprises selling a call option on a first number of shares of company stock, and wherein the buying the first put option comprises buying a put option on a second number of shares of company stock, the second number of shares being no greater than the first number of shares, the first number of shares being no greater than the number of shares of company stock corresponding to the employee options.

44. The method of claim 33 further comprising:

when the price of the company stock on the settlement date is greater than the call strike price, receiving the call strike price from the counterparty, exercising the employee options in order to receive shares of company stock, and delivering the shares of company stock to the counterparty; and when the price of the company stock on the settlement date is lower than the first put strike price, receiving the first put strike price from the counterparty, exercising the employee options in order to receive shares of company stock, and delivering the shares of company stock to the counterparty.

45. The method of claim 33 further comprising:

when the price of the company stock on the settlement date is greater than the call strike price, delivering the difference between the price of the company stock on the settlement date and the call strike price to the counterparty; and when the price of the company stock on the settlement date is lower than the first put strike price, receiving the difference between the first put strike price and the price of the company stock on the settlement date from the counterparty.

46. A method for protecting the value of compensatory employee options issued to an executive of a company, the employee options being stock options on company stock and having an employee option strike price, the method comprising:

hedging the employee options using a calculation processor that determines the values of call and put options based on market conditions relating to the employee options by establishing a collar on company stock on a reference date, the establishing the collar comprising exchanging a call option and a first put option on company stock, the call option having a call strike price, the first put option having a first put strike price that is lower than the call strike price and higher than the employee option strike price, the first put option expiring on a date no later than the expiration date of the call option;

determining a second put option strike price that prevents the executive from benefiting from a decline in price of the company stock below the employee option strike price; and trading a second put option on company stock on the reference date, the second put option having the second put option strike price.

47. A method for protecting the value of compensatory employee options, the employee options being stock options on stock issued by a company and having an employee option strike price, the method comprising:

hedging the employee options using a calculation processor that determines the values of call and put options based on market conditions relating to the employee options by selling a call option on company stock to a first counterparty on a reference date and buying a first put option on company stock from a second counterparty on the reference date, the call option having a call strike price, the first put option having a first put strike price that is lower than the call strike price and higher than the employee option strike price, the first put option expiring on a date no later than the expiration date of the call option;

determining a second put option strike price that prevents the executive from benefiting from a decline in price of the company stock below the employee option strike price; and selling a second put option on company stock on the reference date, the second put option having the second put strike price.

48. A system that protects the value of employee options issued to an executive of a company, the system comprising:

a plurality of workstations that electronically display transaction information to the executive and to a counterparty, the transaction information relating to hedge options and to the employee options, the hedge options including a call option on company stock and including a first put option on company stock, the plurality of workstations including:

a first workstation that is configured to receive an offer to buy the first put option from the executive and to present the offer to buy the first put option to the counterparty;

a second workstation that is configured to receive an offer to buy the call option from the counterparty and to present the offer to buy the call option to the executive, the employee options having an employee option strike price, the call option having a call strike price, the first put option having a first put strike price that is lower than the call strike price and higher than the employee option strike price; and a third workstation that is configured to receive an offer to sell a second put option on company stock from the executive and to present the offer to sell the second put option to the counterparty;

a server coupled to the workstations that processes the transaction information and transaction instructions received from the executive and the counterparty the server configured to determine a second put option strike price that prevents the executive from benefiting from a decline in price of the company stock below the employee option strike price; and a clearing center coupled to the server, the clearing center that causes the transactions to be completed and cleared, and for verifying that the transactions are completed and cleared.

49. The system of claim 48 wherein the first and third workstations are the same.

50. The system of claim 48, the server further comprising a calculation processor that determines the value of the call option and the value of the first put option based on market conditions relating to the hedge options.

51. The system of claim 48, the server further comprising a transaction processor that is adapted to process a plurality of transactions between the executive and the counterparty.

52. The system of claim 48, the server further comprising a memory that stores transaction information relating to a plurality of transactions made between the executive and the counterparty.

53. The system of claim 48 wherein one of the plurality of workstations is adapted to receive a pledge of the employee options from the executive.

54. An apparatus that protects the value of employee options issued to an executive of a company, the apparatus comprising:

a server comprising:

a server storage device;

a server processor connected to the server storage device, the server storage device storing a server program for controlling the server processor; and the server processor operative with the server program to transact the purchase and sale of hedge options between the executive and a counterparty, the hedge options including a call option on company stock and including a first put option on company stock, and to determine a second put option strike price that prevents the executive from benefiting from a decline in price of the company stock below an employee option strike price; and a plurality of workstations, each of the plurality of workstations operative to communicate with the server, each of the workstations comprising:

a workstation storage device;

a workstation processor connected to the workstation storage device, the workstation storage device storing a workstation program for controlling the workstation processor; and the workstation processor operative with the workstation program to:

display transaction information to the executive or to the counterparty, the transaction information relating to the employee options and the hedge options;

receive an offer from the executive to buy the first put option and to present the offer to buy the first put option to the counterparty;

receive an offer to buy the call option from the counterparty and to present the offer to buy the call option to the executive, the employee options having the employee option strike price, the call option having a call strike price, the first put option having a first put strike price that is lower than the call strike price and higher than the employee option strike price; and receive an offer to sell a second put option on company stock from the executive and to present the offer to sell the second put option to the counterparty the second put option having the second put option strike price.

55. The apparatus of claim 54 further comprising a clearing center operative to communicate with the server, the clearing center comprising:

a clearing storage device;

a clearing processor connected to the clearing storage device, the clearing storage device that stores a clearing program for controlling the clearing processor; and the clearing processor that is operative with the clearing program to cause the transactions to be completed and cleared and to verify that the transactions are completed and cleared.

56. The apparatus of claim 54, the server processor further comprising a calculation processor operative with the server program to determine the value of the call option and the value of the first put option based on market conditions relating to the hedge options.

57. The apparatus of claim 54, the server processor further comprising a transaction processor operative with the server program to process a plurality of transactions between the executive and the counterparty.

58. The apparatus of claim 54 wherein the server storage device stores transaction information relating to a plurality of transactions made between the executive and the counterparty.

59. The apparatus of claim 54 wherein the workstation processor is adapted to receive a pledge of the employee options from the executive.

* * * * *